(12) United States Patent
Amale et al.

(10) Patent No.: US 9,783,741 B2
(45) Date of Patent: Oct. 10, 2017

(54) PROCESS FOR VACUUM DISTILLATION OF A CRUDE HYDROCARBON STREAM

(71) Applicant: SHELL OIL COMPANY, Houston, TX (US)

(72) Inventors: Amit Sureshrao Amale, Bangalore (IN); Edmundo Steven Van Doesburg, Amsterdam (NL); Peter Mervyn Wilkinson, Amsterdam (NL)

(73) Assignee: SHELL OIL COMPANY, Houston, TX (US)

( * ) Notice: Subject to any disclaimer, the term of this patent is extended or adjusted under 35 U.S.C. 154(b) by 558 days.

(21) Appl. No.: 14/372,335

(22) PCT Filed: Jan. 15, 2013

(86) PCT No.: PCT/EP2013/050667
§ 371 (c)(1),
(2) Date: Jul. 15, 2014

(87) PCT Pub. No.: WO2013/107738
PCT Pub. Date: Jul. 25, 2013

(65) Prior Publication Data
US 2014/0353138 A1  Dec. 4, 2014

(30) Foreign Application Priority Data

Jan. 17, 2012 (EP) .................................... 12151394

(51) Int. Cl.
*C10G 7/06* (2006.01)
*B01D 3/10* (2006.01)
*B01D 3/14* (2006.01)

(52) U.S. Cl.
CPC ................. *C10G 7/06* (2013.01); *B01D 3/10* (2013.01); *B01D 3/148* (2013.01);
(Continued)

(58) Field of Classification Search
CPC . B01D 3/148; B01D 3/10; C10G 7/06; C10G 2300/107
See application file for complete search history.

(56) References Cited

U.S. PATENT DOCUMENTS 1,997,675 A * 4/1935 Bahlke ..................... C10G 7/00
                                                  196/110
2,338,595 A * 1/1944 Packie ..................... C10G 7/00
                                                  208/353

(Continued)

FOREIGN PATENT DOCUMENTS

EP       0095792       12/1983

*Primary Examiner* — Jonathan Miller
(74) *Attorney, Agent, or Firm* — Charles W. Stewart

(57) ABSTRACT

Disclosed is a process for vacuum distillation of a hydrocarbon stream comprising i) passing a hydrocarbon stream into a preflash vessel maintained under conditions to separate the hydrocarbon stream into a preflash liquid and a preflash vapor, ii) passing the preflash liquid into a vacuum furnace maintained under conditions to heat and partly vaporize the preflash liquid, iii) passing the heated furnace effluent into a zone located in the lower part of a vacuum distillation column maintained under fractionating conditions, and iv) passing the preflash vapor into the vacuum distillation column into a further zone located in the lower part of the vacuum distillation column.

7 Claims, 1 Drawing Sheet

(52) U.S. Cl.
CPC .......... *C10G 2300/107* (2013.01); *C10G 2300/1044* (2013.01); *C10G 2300/4037* (2013.01)

(56) References Cited

U.S. PATENT DOCUMENTS

| | | | |
|---|---|---|---|
| 3,798,153 A | | 3/1974 | Arndt et al. |
| 3,886,062 A | * | 5/1975 | Peiser .................... B01D 3/146 |
| | | | 208/354 |
| 4,082,653 A | | 4/1978 | DeGraff |
| 4,239,618 A | * | 12/1980 | Peiser ...................... C10G 7/00 |
| | | | 208/355 |
| 4,664,784 A | | 5/1987 | Harandi |
| 7,172,686 B1 | | 2/2007 | Ji et al. |
| 2002/0192132 A1 | | 12/2002 | Carlson, Jr. et al. |

* cited by examiner

US 9,783,741 B2

PROCESS FOR VACUUM DISTILLATION OF A CRUDE HYDROCARBON STREAM

PRIORITY CLAIM

The present application is the National Stage (§371) of International Application No. PCT/EP2013/050667, filed Jan. 15, 2013, which claims priority from European application no. 12151394.9, filed Jan. 17, 2012, the disclosures of which are incorporated herein by reference.

BACKGROUND OF THE INVENTION

The invention relates to the vacuum distillation of crude hydrocarbon streams.

The first step in any petroleum refinery is the separation of crude oil into various fractions by distillation, in a so-called crude distillation unit (CDU).

A CDU typically comprises several components. The core of the unit is the main atmospheric distillation column, where the primary fractionation of a crude oil takes place. Steam is introduced into the column's bottom part for stripping purposes. The unit further comprises a preflash vessel and a furnace, both located upstream of the distillation column. The preflash vessel is located upstream of the furnace of the CDU. The vapor leaving the preflash vessel is normally bypassing the furnace and is routed into the main distillation column. Below the feed inlet there is normally a 'stripping' zone where steam is used. This improves gasoil recovery. Several side stream strippers are further connected to the main distillation column for recovering various fractions, such as kerosene (kero stripper) and gasoil (gasoil stripper). A naphtha splitter is usually present for recovering the naphtha fraction, whilst a debutanizer is used for recovery of the C3 and C4 hydrocarbon gases. The reflux arranged at the top of the main distillation column usually comprises a condenser and a reflux drum. Finally, the residue leaving the bottom of the distillation column of the CDU, also known as the long residue (LR), usually is further processed in a high vacuum unit (HVU).

Typically, HVU's aim at separation of vacuum gasoil (VGO) from a heavy residue stream, the short residue (SR). Typically, the total feed to a HVU is first sent to a furnace and from there it goes to a high vacuum column where in some cases also stripping steam is used to further enhance the separation. The use of steam also has some disadvantages such as: a higher condenser duty, increased sour water production, a larger ejector set and a requirement for a larger column diameter due to additional (steam) vapor flow.

When aiming at maximizing the VGO recovery, this can be done by maximizing the operating temperature, by using stripping steam and/or by lowering the pressure in the vacuum distillation as much as possible.

It was now found that the disadvantages of steam mentioned above are overcome by using a preflash vessel upstream of the HVU. In such configuration, the feed is 'flashed' at mild vacuum conditions in the preflash vessel before entering the furnace of the HVU. The vapor flashed off is used for stripping the residue product in the HVU column, and as a result less (or no steam) is required.

In a refinery, a preflash vessel typically is known for its use in a CDU, but not in a HVU.

EP-A-0095792 relates to a flash distillation process wherein a reduced crude or long residue is passed to a flash tower after which the bottoms fraction obtained is stripped in a stripping tower. This bottoms fraction is introduced in the upper part of the stripping tower and flows downwards while in contact with steam and at most a limited amount of hydrocarbon vapor, if any. In this set-up, the vapor or gas added to the stripping tower mainly is steam. Furthermore, stripping is fundamentally different from distillation as stripping aims at preferentially removing light components while distillation separates a hydrocarbon stream into various fractions.

BRIEF SUMMARY OF THE INVENTION

Accordingly, a process is provided for vacuum distillation of a hydrocarbon stream comprising i) passing the hydrocarbon stream into a preflash vessel maintained under conditions to separate the hydrocarbon stream into a preflash liquid and a preflash vapor, ii) passing the preflash liquid into a vacuum furnace maintained under conditions to heat and partly vaporize the preflash liquid, iii) passing the heated furnace effluent into a zone located in the lower part of a vacuum distillation column maintained under fractionating conditions, and iv) passing the preflash vapor into the vacuum distillation column in a further zone located in the lower part of the vacuum distillation column.

DETAILED DESCRIPTION OF THE INVENTION

The lower part of a column is the part below the middle of the column, more preferably between the bottom and 40% wt of the total length of the column.

The hydrocarbon stream used in the HVU may be any heavy hydrocarbon stream to be processed in a HVU. This hydrocarbon stream preferably has an initial boiling point of at least 230° C., more specifically at least 250° C., more specifically at least 270° C., more specifically at least 290° C., more specifically more than 300° C., more specifically at least 310° C., more specifically at least 330° C., most specifically at least 340° C. The initial boiling point is to be measured according to the ASTM method described to be suitable for the hydrocarbon fraction in question. For long residue, ASTM D-2887 would be suitable. The initial boiling point generally will be less than 500° C., more specifically less than 450° C., more specifically less than 400° C., most specifically less than 380° C. If the initial boiling point is measured under vacuum, it is to be converted to the corresponding temperature at atmospheric pressure.

Preferably, the hydrocarbon stream is the residue stream leaving the CDU, also called the long residue.

The term LR as used throughout this document is meant to refer to any hydrocarbon stream to be processed in an HVU.

By using a preflash vessel, the lighter gasoil (GO) components of the LR, which hardly dissolve in the SR at the conditions of the vacuum distillation column, are flashed off in the preflash vessel. In addition, stripping by the preflash vapor generated from the LR helps to lift the remaining waxy distillate contained in the SR without adding any load to the HVU vacuum system. Because the preflashed vapor bypasses the vacuum furnace, the total heat input into the HVU feed is less compared to the conventional line-up without preflash drum. Thus, use of the configuration as described herein results in an increase in waxy distillate yield with acceptable quality and savings in HVU furnace duty. Several disadvantages of steam stripping also do not occur when applying stripping using the preflash vapor. Furthermore energy is saved relative to the alternative schemes due to the fact that the intake of steam can be reduced or even abolished and because the feed to the furnace is reduced (the preflash vapor will bypass the furnace).

Figure 1:
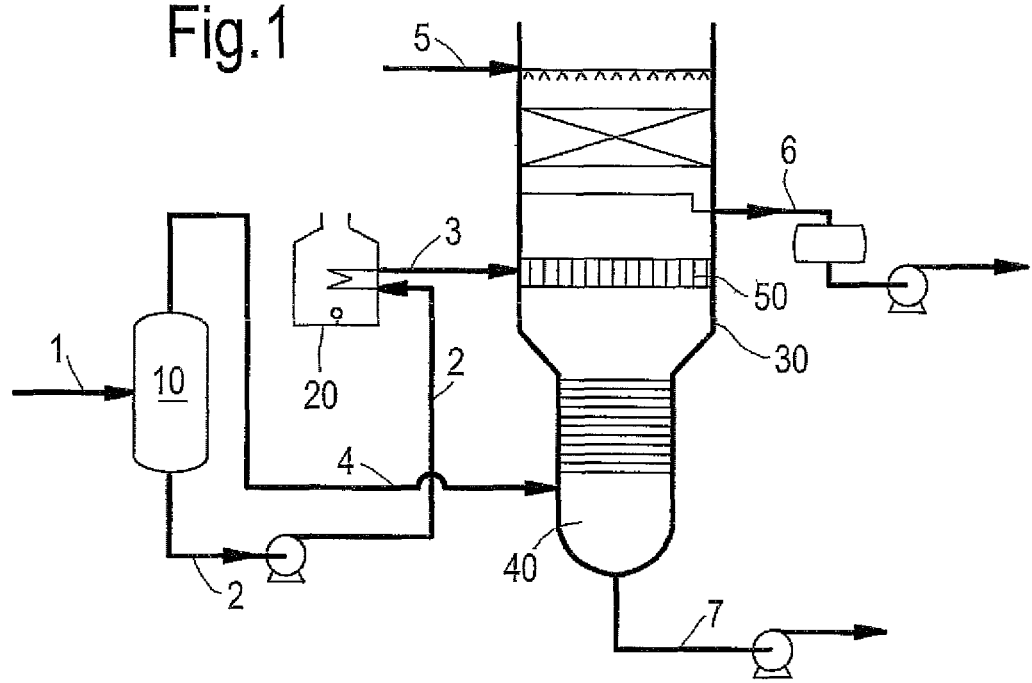
FIG. 1 illustrates one configuration of the process of the invention.
Figure 2:
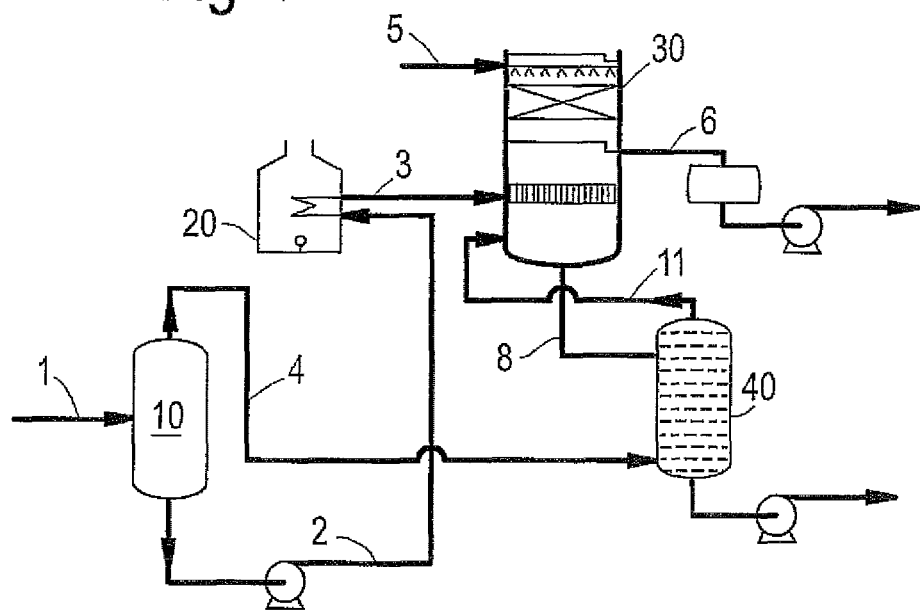
FIG. 2 illustrates another embodiment of the process of the invention.

Embodiments of the process and configuration as described herein are shown in FIGS. 1 and 2.

As described herein, the LR leaving the CDU, or any other suitable hydrocarbon stream, is treated in the preflash vessel under conditions to separate said residue into a preflash liquid and a preflash vapor. Suitable conditions are commonly known to those skilled in the art and can vary substantially depending on the nature of the residue and the design of the unit. Typical preflash vessel operating pressures are mild vacuum conditions in the range from 0.1 bara to 0.8 bara, while the typical temperature varies between 340° C. and 360° C. If LR directly from the CDU is used, care should be taken to apply a pressure in the preflash vessel that is lower than the pressure in the CDU. By preflashing, the lighter gasoil components of the residue of the HVU, which hardly dissolve in this residue at the conditions of the HVU distillation column, advantageously flash off in the preflash vessel.

The preflash vessel may be placed at any location between the CDU bottom and the HVU furnace but preferably at the point with the highest temperature.

The preflash liquid leaving the preflash vessel subsequently is passed into a vacuum furnace, wherein it is heated to a temperature typically in the range from 380° C. to 430° C., depending on the LR used and on the SR needed, also as is typically known to those skilled in the art.

The preflash vapor introduced into the vacuum distillation column contains at least 50% wt of hydrocarbons, more specifically at least 60% wt, preferably at least 70% wt, most preferably at least 80% wt. Preferably, at least 50% wt of the total amount of compounds introduced into the vacuum column as gas or vapour consists of hydrocarbons. More typically, this amount is at least 60% wt, preferably at least 70% wt and most preferably at least 80% wt.

The heated furnace effluent is passed into the vacuum distillation column, typically in a zone located in the lower part of the column, generally the bottom section.

The zone for introduction of the preflash vapor may coincide with or, preferably, is located below the zone for introduction of the furnace effluent.

A vacuum distillation is operated at a pressure of less than 1 atmosphere absolute, typically less than 0.7 atmosphere, preferably less than 0.5 bar, more preferably less than 0.4 bar, more preferably less than 0.3 bar, more preferably less than 0.2 bar, and most preferably at at most 0.1 bar. Typically, the pressure will be at least 1 millibar.

FIG. 1 illustrates a preferred configuration in which LR from a CDU is sent via line 1 to preflash vessel 10 to obtain preflash liquid which is sent via line 2 to the HVU furnace 20 and subsequently via line 3 to zone 50 of the HVU column 30. Preflash vapor is passed via line 4 into the HVU column 30 into a further zone 40 located in the lower part of the vacuum distillation column. The zone 50 in which the preflash liquid is introduced, is located above the zone 30 in which the preflash vapor is introduced. Optionally, wash oil can be added to the HVU column via line 5 and dirty wash oil removed via line 6. SR is removed via line 7.

In a preferred embodiment, the further zone for introduction of the preflash vapor is located at the bottom of a stripping zone being located below the zone for introduction of the furnace effluent, such that the residue of the furnace effluent is contacted with preflash vapor in the stripping zone under conditions to strip the residue.

In another embodiment, part of the preflash vapor may be passed into the distillation column in the zone where the furnace effluent is introduced, and part may be introduced at the bottom of the stripping zone, for instance when the amount of preflash vapor is too high for stripping purposes.

In one embodiment, steam maybe passed into the vacuum distillation column in a zone at the bottom of the stripping zone being located below the zone for introduction of the preflash liquid, such that the residue of the preflash liquid is contacted with steam in the stripping zone under conditions to strip the residue.

In this way, the preflash vapor, and optionally steam advantageously function as a stripping medium. As a consequence of using the preflash vapor as a stripping medium, the amount of steam used can be substantially reduced. It is even possible to completely abolish steam as stripping medium. The reduction of steam has several associated benefits such as: reduction of vapor load in the column, reduction of sour water production (due to less steam being condensed).

The stripping zone preferably contains a number of trays, preferably 4 to 8 trays, or a packing. In one embodiment, part or all of the preflash vapor is passed into a zone at the bottom of a separate stripping vessel located downstream of the vacuum distillation column. This configuration is illustrated in the embodiment of FIG. 2.

Where the same reference numerals are used in FIGS. 1 and 2, they refer to the same or similar objects.

Residue from the vacuum distillation column 30, the Short Residue (SR), is sent via line 8 to the stripping vessel 40, where it is stripped by the preflash vapor coming via line 4 from the preflash vessel 10. The vapor leaving the SR stripping vessel 40 via line 11 is passed into a zone at bottom of the stripping zone of the vacuum distillation column 30, as described herein before, where it may help to lift the remaining of the waxy distillate contained in the SR without adding any load to the HVU vacuum system. The zone for introduction into the distillation column of the vapor leaving the SR stripping vessel may coincide with or, preferably, is located below the zone for introduction of the furnace effluent.

In one embodiment, the preflash vapor leaving the preflash vessel 10 is directly passed into the vacuum distillation column 30 and/or into the SR stripping vessel 40, bypassing the furnace 20. Alternatively, the preflash vapor leaving the preflash vessel 10 may firstly be heated in the furnace convection bank 3 to improve the stripping effect of the preflash vapor, or, alternatively, a different heating medium may be used such as high pressure steam, or hot-oil.

The residue and distillate fractions leaving the HVU are further processed as desired.

There is further provided a HVU unit being configured to allow performance of the process as described herein. The HVU comprises a preflash vessel, a vacuum furnace and a vacuum distillation column, the preflash vessel being configured to pass preflash vapor into a zone located in the lower part of the vacuum distillation column and to pass preflash liquid to the vacuum furnace, the vacuum furnace being configured to pass furnace effluent into a further zone located in the lower part of the vacuum distillation column.

The zone for introduction of preflash vapor is preferably located below the zone for introduction of the furnace effluent.

The vacuum distillation column may further contain a stripping zone located below the zone for introduction of preflash liquid, for stripping the residue of the furnace effluent with preflash vapor and, optionally, steam.

In the embodiments of FIGS. 1 and 2, the vacuum distillation column further is provided with a wash oil (WO) section, as is commonly used.

The HVU may further comprise a stripping vessel for stripping the residue from the vacuum distillation column configured to pass preflash vapor into a zone located in the lower part of the vacuum distillation column.

That which is claimed is:

1. A process for the vacuum distillation of a long residue hydrocarbon stream yielded as a bottoms product from a crude oil atmospheric column and having an initial boiling point of at least 230° C. wherein the process comprises:
    i) passing the long residue hydrocarbon stream into a preflash vessel maintained under mild vacuum conditions and providing for separating the long residue hydrocarbon stream into a preflash liquid and a preflash vapor;
    ii) passing the preflash liquid into a vacuum furnace maintained under conditions providing for heating and partly vaporizing the preflash liquid thereby yielding a heated furnace effluent;
    iii) passing the heated furnace effluent to a vacuum distillation column having a length and defining a lower part and a middle part, wherein the lower part is positioned between a bottom to the vacuum distillation column and up to 40% of the length of the vacuum distillation column and wherein the lower part includes a first zone located above a second zone providing for receiving the preflash liquid, and introducing the heated furnace effluent into the first zone that is maintained under fractionating conditions;
    iv) yielding from the vacuum distillation column a short residue stream, whish is passed to a stripping vessel, and passing the preflash vapor to the stripping vessel, wherein the stripping vessel provides for stripping of the short residue stream to yield a vapor stream; and
    v) passing the vapor stream into the second zone.

2. The process according to claim 1, wherein the preflash vapor is heated in the furnace convection bank prior to passing it into the stripping vessel.

3. The process according to claim 1, wherein the preflash vapor is heated by high pressure steam or hot oil prior to passing it into the stripping vessel.

4. The process according to claim 1, wherein the vacuum distillation column is operated at a pressure of less than 1 atmosphere absolute.

5. The process according to claim 4, wherein the initial boiling point of the long residue hydrocarbon stream is at least 250° C.

6. The process according to claim 5, wherein the heated furnace effluent is heated to a temperature in the range of from 380° C. to 430° C.

7. A high vacuum unit (HVU) for vacuum distillation of a long residue hydrocarbon stream, the unit comprising:
    a preflash vessel, providing for separating the long residue hydrocarbon stream into a preflash liquid and a preflash vapor;
    a vacuum furnace operatively connected to the preflash vessel and providing for heating and partly vaporizing the preflash liquid to yield a heated furnace effluent;
    a vacuum distillation column operatively connected to the vacuum furnace and having a length and defining a lower part and a middle part, wherein the lower part is positioned between a bottom to the vacuum distillation column and up to 40% of the length of the vacuum distillation column, wherein the lower part includes a first zone located above a second zone providing for receiving the heated furnace effluent;
    a stripping vessel operatively connected to the vacuum distillation column providing for receiving a short residue stream from the vacuum distillation column, and operatively connected to the preflash vessel for receiving the preflash vapor, and operatively connected to the vacuum distillation column providing for passing a vapor system stream yielded from the stripping vessel.

* * * * *